United States Patent
Park et al.

(10) Patent No.: US 12,220,698 B2
(45) Date of Patent: Feb. 11, 2025

(54) MICROFLUIDIC CHIP, AND APPARATUS AND METHOD FOR DETECTING BIOMOLECULES

(71) Applicant: SAMSUNG ELECTRONICS CO., LTD., Suwon-si (KR)

(72) Inventors: Moon Seong Park, Suwon-si (KR); Kak Namkoong, Seoul (KR); Won Jong Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 276 days.

(21) Appl. No.: 17/343,409

(22) Filed: Jun. 9, 2021

(65) Prior Publication Data
US 2021/0402396 A1 Dec. 30, 2021

(30) Foreign Application Priority Data

Jun. 30, 2020 (KR) .................. 10-2020-0079882
Mar. 3, 2021 (KR) .................. 10-2021-0028301

(51) Int. Cl.
G01N 21/64 (2006.01)
B01L 3/00 (2006.01)
B01L 7/00 (2006.01)

(52) U.S. Cl.
CPC ......... *B01L 3/502715* (2013.01); *B01L 3/567* (2013.01); *B01L 7/52* (2013.01);
(Continued)

(58) Field of Classification Search
CPC ..... B01L 2300/0864; B01L 2300/0636; B01L 2200/10; B01L 2200/0631; B01L 2300/0816; B01L 3/5027; G01N 21/6486
See application file for complete search history.

(56) References Cited

U.S. PATENT DOCUMENTS 9,074,204 B2   7/2015   Anderson et al.
9,114,398 B2   8/2015   Knight et al.
(Continued)

FOREIGN PATENT DOCUMENTS

CN   106434317 B   4/2019
CN   110643488 A   1/2020
(Continued)

OTHER PUBLICATIONS

De Mello et al., "Dealing with 'real' samples: sample pre-treatment in microfluidic systems", Lab Chip, vol. 3, pp. 11N-19N. (Year: 2003).*
(Continued)

*Primary Examiner* — Young J Kim
(74) *Attorney, Agent, or Firm* — Sughrue Mion, PLLC

(57) ABSTRACT

Provided are a microfluidic chip, and an apparatus and a method for detecting biomolecules by using the microfluidic chip. According to an example embodiment, the microfluidic chip includes: a first storage configured to accommodate a sample, the sample including target materials; a plurality of second storages connected to the first storage, the plurality of second storages including reactants for the target materials; and a plurality of well arrays connected to the plurality of second storages, respectively, and configured to accommodate a solution of the sample, in which the reactants for the target materials are dissolved.

31 Claims, 12 Drawing Sheets

(52) U.S. Cl.
CPC .. *G01N 21/6486* (2013.01); *B01L 2200/0684* (2013.01); *B01L 2200/10* (2013.01); *B01L 2300/0636* (2013.01); *B01L 2300/0663* (2013.01); *B01L 2300/0681* (2013.01); *B01L 2300/069* (2013.01); *B01L 2300/16* (2013.01); *B01L 2300/1822* (2013.01); *B01L 2400/06* (2013.01); *G01N 2201/0231* (2013.01)

(56) References Cited

U.S. PATENT DOCUMENTS

| | | | |
|---|---|---|---|
| 9,304,065 | B2 | 4/2016 | Fowler et al. |
| 9,429,500 | B2 | 8/2016 | Fowler et al. |
| 9,506,845 | B2 | 11/2016 | Fowler et al. |
| 9,952,126 | B2 | 4/2018 | Fowler et al. |
| 9,994,891 | B2 | 6/2018 | Wende et al. |
| 10,501,786 | B2 | 12/2019 | Anderson et al. |
| 2002/0058273 | A1* | 5/2002 | Shipwash .......... G01N 33/6818 435/6.12 |
| 2008/0280285 | A1* | 11/2008 | Chen ................ G01N 35/00029 436/86 |
| 2011/0237445 | A1 | 9/2011 | Andersson Svahn et al. |
| 2013/0302884 | A1 | 11/2013 | Fowler et al. |
| 2015/0011430 | A1 | 1/2015 | Saxonov |
| 2016/0122792 | A1 | 5/2016 | Peterson et al. |
| 2018/0306683 | A1 | 10/2018 | Fowler et al. |
| 2019/0046989 | A1 | 2/2019 | Ririe et al. |
| 2020/0038871 | A1* | 2/2020 | Barany ............. B01L 3/502761 |

FOREIGN PATENT DOCUMENTS

| | | | |
|---|---|---|---|
| JP | 6169111 B2 | 7/2017 | |
| JP | 6262657 B2 | 1/2018 | |
| KR | 10-1391066 B1 | 5/2014 | |
| KR | 10-1440997 B1 | 9/2014 | |
| KR | 10-1484408 B1 | 1/2015 | |
| KR | 10-2099151 B1 | 4/2020 | |
| KR | 10-2115094 B1 | 5/2020 | |
| WO | WO-0141931 A2 * | 6/2001 | .......... B01J 19/0093 |
| WO | WO-2018183723 A1 * | 10/2018 | .......... B01F 13/0064 |

OTHER PUBLICATIONS

Communication dated Nov. 26, 2021, from the European Patent Office in European Application No. 21181471.0.

Basu, Amar S., "Digital Assays Part 1: Partitioning Statistics and Digital PCR", Micro- and Nanotechnologies for Quantitative Biology and Medicine, SLAS Technology, Society for Laboratory Automation and Screening, vol. 22(4) DOI: 10.1177/2472630317705680, Jan. 20, 2017, pp. 369-386 (18 total pages).

* cited by examiner

MICROFLUIDIC CHIP, AND APPARATUS AND METHOD FOR DETECTING BIOMOLECULES

CROSS-REFERENCE TO RELATED APPLICATION(S)

This application claims priority from Korean Patent Application No. 10-2020-0079882, filed on Jun. 30, 2020, and Korean Patent Application No. 10-2021-0028301, filed on Mar. 3, 2021, in the Korean Intellectual Property Office, the entire disclosures of which are incorporated by reference herein for all purposes.

BACKGROUND

1. Field

The disclosure relates to an apparatus and a method for detecting biomolecules.

2. Description of Related Art

Clinical or environmental samples are analyzed by a series of biochemical, chemical, and mechanical treatment processes. Recently, development of technology for diagnosis or monitoring of biological samples receive much attention. Molecular diagnosis based on nucleic acid has excellent accuracy and sensitivity, and thus is increasingly used in various applications, such as diagnosis of infectious diseases or cancer, pharmacogenomics, development of new drugs, and the like. Microfluidic devices are widely used in order to analyze samples conveniently and accurately according to various purposes.

SUMMARY

According to an aspect of the disclosure, provided is a microfluidic chip including: a first storage configured to accommodate a sample, the sample including target materials; a plurality of second storages connected to the first storage, the plurality of second storages including reactants for the target materials; and a plurality of well arrays connected to the plurality of second storages, respectively, and configured to accommodate a solution of the sample, in which the reactants for the target materials are dissolved.

A number of the plurality of second storages may correspond to a number of the target materials, and is in a range of 1 to 20.

A number of the plurality of well arrays may be greater than or equal to the number of the plurality of second storages.

A size of a well included in each of the plurality of well arrays may be less than or equal to 1 nL.

A number of wells included in each of the plurality of well arrays may be in a range of ten thousand to one million.

A bottom and a wall of a well included in each of the plurality of well arrays may have different surface properties.

At least one of the first storage or a well array, of the plurality of well arrays, may include at least one of a field effect transistor (FET), a silicon photonic structure, a two-dimensional (2D) micro material, a 2D nano material, a 2D micro structure, or a 2D nano structure.

The microfluidic chip may further include a filter on a channel, the channel connecting the first storage and the plurality of second storages.

The microfluidic chip may further include a mixer disposed inside a second storage of the plurality of second storages or at an outlet of the second storage.

The microfluidic chip may further include a valve on each of channels, the channels respectively connecting the plurality of second storages and the plurality of well arrays.

The microfluidic chip may further include an absorption pad connected to the plurality of well arrays.

The microfluidic chip may further include a valve on each of channels, the channels respectively connecting the plurality of well arrays and the absorption pad.

The microfluidic chip may further include at least one of: a slide, a centrifuge, or a stamper, configured to inject the solution of the sample of the plurality of second storages into the plurality of well arrays or to fix the solution of the sample to the plurality of well arrays.

The microfluidic chip may further include at least one of a bubble trap, a bubble removing material, or a gas permeable material, provided inside a well array, of the plurality of well arrays, or at an inlet of the well array.

According to an aspect of the disclosure, provided is a microfluidic chip including: a storage configured to accommodate a sample, the sample including a target material, the storage including a reactant for the target material; a mixer disposed between the storage and a well array, the mixer being configured to mix a solution of the sample, in which the reactant for the target material is dissolved; and the well array in which an enzyme reaction of the solution of the sample injected through the mixer occurs.

At least one of the storage or the well array may include at least one of a field effect transistor (FET), a silicon photonic structure, a 2D micro material, a 2D nano material, a 2D micro structure, and a 2D nano structure.

The microfluidic chip may further include a filter at an outlet of the storage.

According to an aspect of the disclosure, provided is an apparatus for detecting biomolecules, the apparatus including: a first storage configured to accommodate a sample, the sample including target materials; a plurality of second storages, each of which includes reactants for the target materials; a plurality of well arrays in which an enzyme reaction of a solution of the sample, in which the reactants for the target materials are dissolved, occurs; an optical unit, including a light source and a detector, the optical unit being configured to, during an occurrence of the enzyme reaction, emit first light onto the solution of the sample in the plurality of well arrays and configured to measure an optical signal reflected from the solution of the sample; and a processor configured to detect biomolecules based on the optical signal.

The target materials may include one or more of a duplex of one or more of ribonucleic acid (RNA), deoxyribonucleic acid (DNA), peptide nucleic acid (PNA), and locked nucleic acid (LNA); oligopeptide, protein, and toxin.

The reactants for the target materials may include one or more of reverse transcriptase, polymerase, ligase, peroxidase, primer, and probe.

The primer may include oligonucleotide.

The probe may include at least one of oligonucleotide, a fluorescent material, or quencher.

The reactants for the target materials may be freeze-dried.

The apparatus may further include a pretreatment unit configured to perform pretreatment of the sample accommodated in the first storage, the pretreatment unit including at least one of: a heater, chemical treatment area, magnetic beads, solid phase extractor, or ultrasonic source.

The apparatus may further include a temperature controller configured to control a temperature of the sample accommodated in the first storage.

The temperature controller may include at least one of an optical heater, an electrical heater, or a temperature sensor, the optical heater including a light source configured to emit second light onto the first storage and a heating material configured to react to the second light, and the electrical heater including one of a heating element and a Peltier element.

The enzyme reaction may include at least one of a nucleic acid amplification reaction, oxidation-reduction reaction, or hydrolytic reaction, the nucleic acid amplification reaction including at least one of polymerase chain reaction (PCR) amplification or isothermal amplification.

The optical signal may include at least one of fluorescence, phosphorescence, absorbance, and surface plasmon resonance.

According to an aspect of the disclosure, provided is a method of detecting biomolecules, the method including: loading a sample in a first storage of a microfluidic chip; providing the sample, loaded in the first storage, to a plurality of second storages, each of the plurality of second storages including reactants for target materials; injecting a solution of the sample, in which the reactants are dissolved, from the plurality of second storages into well arrays; and measuring an optical signal during an enzyme reaction that occurs in the solution of the sample injected into the well arrays; and detecting biomolecules based on the measured optical signal.

The method may further include performing pretreatment of the sample loaded in the first storage, the pretreatment including at least one of heating, chemical treatment, treatment with magnetic beads, solid phase extraction, or ultrasonication.

The target materials may include RNA, and the reactants for the target materials may include reverse transcriptase.

The enzyme reaction may include at least one of a nucleic acid amplification reaction, oxidation-reduction reaction, or hydrolytic reaction, the nucleic acid amplification reaction including at least one of polymerase chain reaction (PCR) amplification or isothermal amplification.

BRIEF DESCRIPTION OF THE DRAWINGS

The above and other aspects, features, and advantages of the disclosure will be more apparent from the following detailed description taken in conjunction with the accompanying drawings.

DETAILED DESCRIPTION

Figure 1:
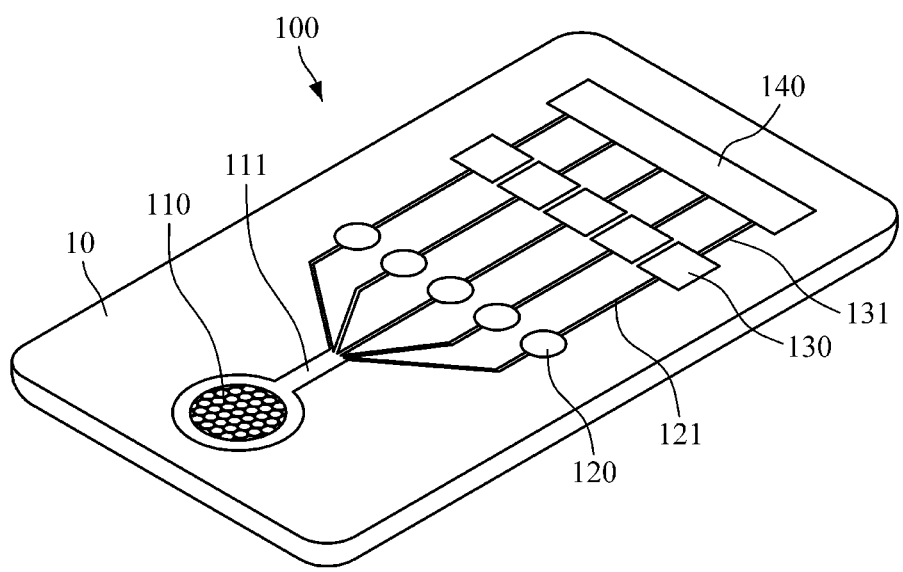
FIG. 1 is a diagram illustrating a microfluidic chip according to an example embodiment.

Details of example embodiments are included in the following detailed description and drawings. Advantages and features of the disclosure, and a method of achieving the same will be more clearly understood from the following example embodiments described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as 'unit' or 'module', etc., should be understood as a unit that performs at least one function or operation and that may be embodied as hardware, software, or a combination thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, various example embodiments of a microfluidic chip, and an apparatus and a method for detecting biomolecules will be described in detail with reference to the accompanying drawings.

Figure 2:
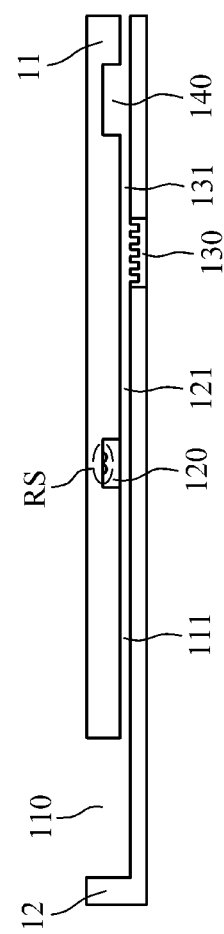
FIG. 2 is a side view of the microfluidic chip of FIG. 1.

FIG. 1 is a diagram illustrating a microfluidic chip according to an example embodiment. FIG. 2 is a side view of the microfluidic chip of FIG. 1.

Referring to FIG. 1, a microfluidic chip 100 includes structures such as a first storage 110, a plurality of second storages 120, a well array 130 having a plurality of wells, and channels 111, 121, and 131. In the microfluidic chip 100, the first storage 110, the second storages 120, and the well array 130 are arranged in an order, and an absorption pad 140 may be further included which is disposed at a distal end of the microfluidic chip 100 and serves to absorb a sample solution so that the sample solution may be moved by capillarity.

The microfluidic chip 100 may include a substrate 10, on which the microfluidic structures are disposed. As illustrated in FIG. 2, the substrate 10 may have a two-layer structure in which an upper plate 11 and a lower plate 12 are coupled to each other. The first storage 110, the second storages 120, the well array 130, and the absorption pad 140 may be disposed on the upper plate 11 or the lower plate 12 as illustrate in FIG. 2, and the channels 111, 121, and 131, through which a fluid passes, may be formed between the upper plate 11 and the lower plate 12. The substrate 10 may include an inorganic material, such as glass, silicon, ceramic, graphite, etc., or a material such as acrylic material, polyethylene terephthalate (PET), polycarbonate, polystyrene, polypropylene, and the like. The microfluidic structures may be formed on the substrate 10 by etching, milling, drilling, and the like.

In addition, the microfluidic chip 100 may further include a structure (not shown), such as an active and/or passive driving device, a capillary or an electro-wetting device, etc., that is used for the flow of a micro-fluid. The active and/or passive driving device may include a passive vacuum void pump, a syringe pump, a vacuum pump, a pneumatic pump, and the like but is not limited thereto.

A sample is loaded and received in the first storage 110, and may be dispersed in the plurality of second storages 120 through the first channel 111. As illustrated in FIG. 1, the first channel 111 may have one inlet formed therein, which is connected to an outlet provided in the first storage 110, and may have a plurality of outlets respectively connected to the plurality of second storages 120. However, the first storage 110 is not limited thereto, and may have outlets formed at a plurality of portions of the first storage 110, so that a plurality of first channels 111 may be connected thereto.

The sample may include respiratory secretions, or bio-fluids including at least one of blood, urine, perspiration, tears, saliva, etc., or a swab sample of an upper respiratory tract, or a solution of the bio-fluid or the swab sample dispersed in other medium. In this case, the other medium may include water, saline solution, alcohol, phosphate buffered saline solution, vital transport media, etc., but is not limited thereto. A volume of the sample may be in a range of 1 μL to 1000 μL, and may be, for example, 20 μL.

The sample loaded in the first storage 110 may be pretreated before being dispersed and received in the second storages 120. For example, the sample may be pretreated by heating, chemical treatment, treatment with magnetic beads, solid phase extraction, ultrasonication, or the like. A material or a structure for pretreatment may be formed inside or outside of the first storage 110.

Further, the first storage 110 may include a field effect transistor (FET), a silicon photonic structure, a two-dimensional (2D) micro/nano (or micro and/or nano) material, a 2D micro/nano structure, and the like. In addition, the first storage 110 may include a material and/or structure, having optical or electrical heating properties, for controlling temperature of the sample. For example, the first storage 110 may include an optical heating material and/or structure, that reacts to a light source such as a light emitted diode (LED), laser, Vertical-Cavity Surface-Emitting Laser (VCSEL), etc., or may include an electrical heating element such as a Peltier element and the like.

One or more second storages 120 may be provided for each target material. A number of the second storages 120 may be determined according to a number of target materials, a size of the microfluidic chip 100, etc., and may be, for example, in a range of 1 to 20, or may be, for example, 10. The target material may include a duplex of one or more of ribonucleic acid (RNA), deoxyribonucleic acid (DNA), peptide nucleic acid (PNA), and locked nucleic acid (LNA), oligopeptide, protein, toxin, etc., but is not limited thereto.

The second storages 120 may include at least one reactant for each target material, and the respective second storages 120 may include reactants for different target materials. As illustrated in FIG. 2, a reactant RS for a target material may be freeze-dried to be fixed to the second storages 120. The reactant for each target material may include reverse transcriptase, polymerase, ligase, peroxidase, primer, probe, etc., but is not limited thereto. The primer may include oligonucleotide, for example, target specific single strand oligonucleotide. Further, the probe may include oligonucleotide, for example, target specific single strand oligonucleotide, a fluorescent material, quencher, and the like. The probe may exhibit a fluorescence signal by interacting with a specific target material in a solution, in which different types of materials are dissolved. Such characteristic signal may be tracked, detected, and processed for a predetermined period of time by an optical unit and/or a processor of an apparatus for detecting biomolecules, to be used in detecting the biomolecules.

The sample, loaded and/or pretreated in the first storage 110 may be dispersed and received in the second storages 120. In this case, structures, such as an active and/or passive driving device, a capillary or an electro-wetting device, etc., may be used for the flow of a microfluidic sample. When the sample is introduced into the second storages 120, a reactant for a target material, freeze-dried and fixed to the second storages 120, is dissolved in the sample.

The well array 130 may include a plurality of wells having a micro/nano structure, and a sample solution, in which reactants of target materials are dissolved, is introduced from the respective second storages 120 into the wells corresponding thereto. A number of the well array 130 is determined according to a number of the target materials, and may be, for example, in a range of 1 to 20 and may be greater than or equal to a number of the second storages 120. A size of a well included in each well array 130 may be, for example, 1 nL or less. Further, a number of the wells included in each well array 130 may be in a range of ten thousand to one million and may be, for example, twenty thousand.

A bottom and a wall of the respective wells may have different properties, e.g., different wettability. Further, a structure (not shown) for removing gaseous bubbles, e.g., a bubble trap, a bubble removing material and/or chamber, and/or a gas permeable material, may be disposed inside each well array 130 or at an inlet of the well array 130. The respective wells of the well array 130 may include a field effect transistor (FET), a silicon photonic structure, a 2D micro/nano material, and the like. In addition, each well of the well array 130 may include an optical heating material and/or structure, that reacts to an external light source such as a light emitted diode (LED), laser, Vertical-Cavity Surface-Emitting Laser (VCSEL), etc., so as to have optical heating properties; or each well of the well array 130 may include an electrical heating element such as a Peltier element and the like so as to have electrical heating properties.

The sample solution, in which reactants of target materials are dissolved, is introduced from the respective second storages 120 into each corresponding well array 130 through the second channel 121. In this case, in order to fill the wells of each well array 130 with a sample fluid or to fix the sample fluid thereto, a sliding device (or a slide), a centrifuge device (or a centrifuge), or a stamping device (or a stamper) and the like may be used which is disposed in the microfluidic chip 100.

The sample solution, introduced into each well array 130, may be subject to enzyme reaction for a predetermined period of time in order to detect biomolecules. In this case, reverse transcription using reverse transcriptase may be performed on an RNA sample in each well array 130. The enzyme reaction may include, for example, a nucleic acid amplification reaction including at least one of polymerase chain reaction (PCR) amplification and isothermal amplification, or oxidation-reduction reaction, hydrolytic reaction, and the like. While the enzyme reaction is performed in each well array 130, an optical signal is measured by an optical unit and/or a processor of the apparatus for detecting biomolecules, and the biomolecules may be detected based on the measured optical signal. The optical signal may include fluorescence, phosphorescence, absorbance, surface plasmon resonance, and the like. As described above, the microfluidic chip 100 may be used to detect the presence of a target DNA template, quantitative information, and the like during a replication process of polymerase.

As illustrated in FIG. 1, the absorption pad 140 is disposed at a rear end of the well array 130 and connected to the well array 130 through the third channel 131, and may move and drain the sample solution. As described above, by providing the absorption pad 140, a velocity of inflow or transfer of the sample may be easily controlled. However, the absorption pad 140 is not limited thereto, and by varying the position, size, and type of the absorption pad 140, a flow velocity and a flow amount of the sample solution passing through the wells may be controlled. For example, during the enzyme reaction, the sample may be moved at a slow speed, and during washing, the sample may be moved at a fast speed, such that reaction sensitivity may be improved. While the absorption pad 140 is illustratively described as an example of a structure configured to control a velocity of an inflow of the sample, the structure is not limited to the absorption pad, and may additionally or alternatively include, for example, a vacuum pump, an active pump, and a capillary pump.

Figure 3:
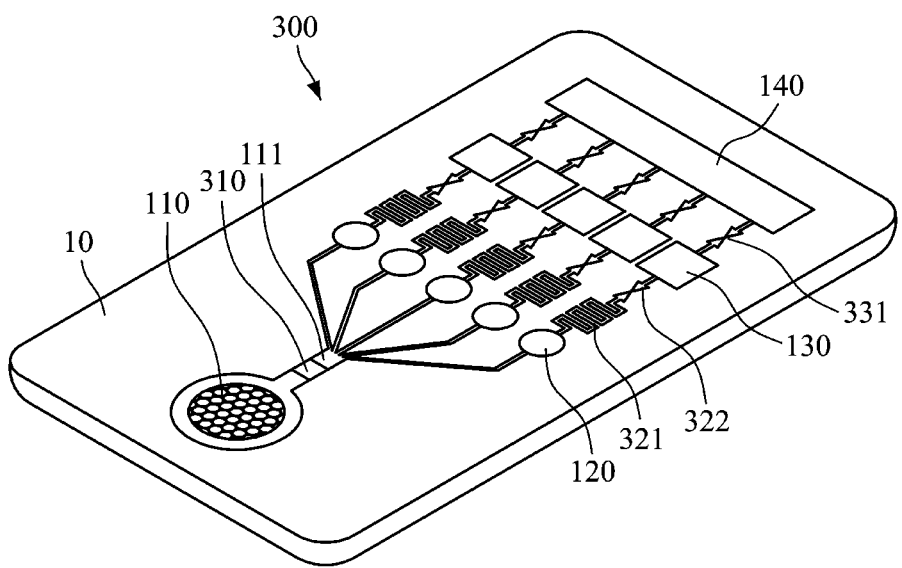
FIG. 3 is a diagram illustrating a microfluidic chip according to an example embodiment.

FIG. 3 is a diagram illustrating a microfluidic chip according to another example embodiment.

Referring to FIG. 3, a microfluidic chip 300 according to an example embodiment may include the first channel 111 connecting the first storage 110 and the second storage 120, and a filter 310 formed on an outlet side of the first storage 110.

The filter 310 may block biomolecules in the sample loaded and pre-treated in the first storage 110, and may pass only a fluid. The filter 310 may be a single-layer or a multi-layer filter having micro holes and formed as a membrane, and according to a size of the holes, the filter 310 may block the biomolecules of a desired size. The filter 310 may include, for example, silicon, polyvinylidene fluoride (PVDF), polyethersulfone, polycarbonate, glass fiber, polypropylene, cellulose, mixed cellulose esters, polytetrafluoroethylene (PTFE), polyethylene terephthalate, polyvinyl chloride (PVC), nylon, phosphocellulose, diethylaminoethyl cellulose (DEAE), and the like, but is not limited thereto. The holes may have various shapes, such as a circular shape, a square shape, a slit shape, an irregular shape by glass fiber, and the like.

In addition, the microfluidic chip 300 may further include a mixer 321 that mixes a sample solution, in which reactants of target materials are dissolved, in the second storages 120. As illustrated in FIG. 3, the mixer 321 may be disposed on the outlet side of the second storages 120, which are connected to the well array 130 through the second channel. However, the mixer 321 is not limited thereto, and may be disposed inside the second storages 120.

Further, the microfluidic chip 300 may further include a first valve 322 disposed at the second channel that connects the second storages 120 and the well array 130, and configured to control a fluid flow from the second storages 120 to the well array 130, and/or a second valve 331 disposed at the third channel connecting the well array 130 and the absorption pad 140, and configured to control a fluid flow from the well array 130 to the absorption pad 140. As illustrated in FIG. 3, the first valve 322 may be disposed at the outlet of the second storages 120, or at the outlet of the mixer 321 when the mixer 321 is provided. The first valve 322 and the second valve 331 may be various types of microvalves that open and close a microfluidic channel. For example, the microvalves may include an active microvalve, such as a pneumatic and/or thermopneumatic actuated valve, an electrostatically actuated valve, a piezoelectrically actuated valve, an electromagnetically actuated valve; or a passive microvalve that opens and closes by using a fluid flow or a difference in interfacial tension without artificial external operation, but the microvalves are not particularly limited thereto.

Figure 4:
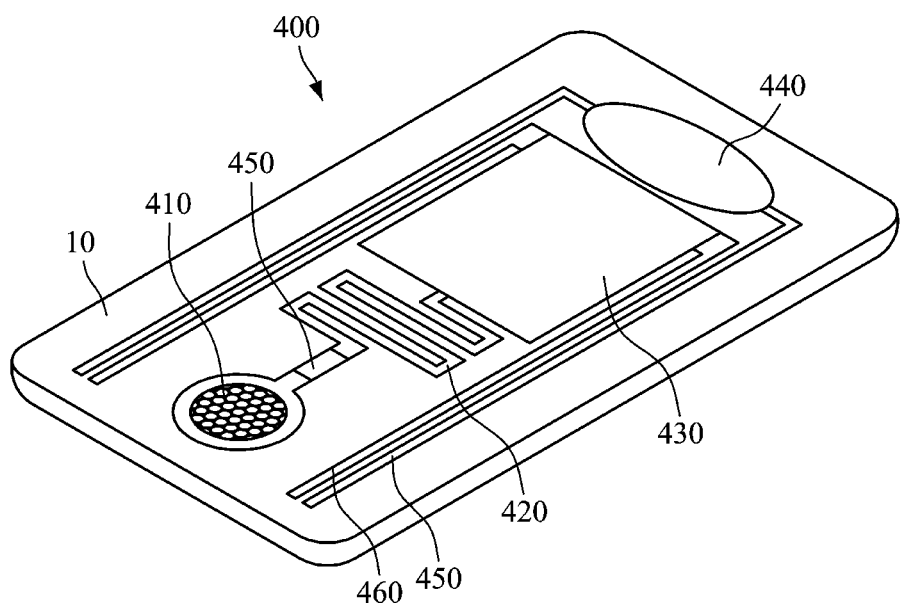
FIG. 4 is a diagram illustrating a microfluidic chip according to an example embodiment.
Figure 5:
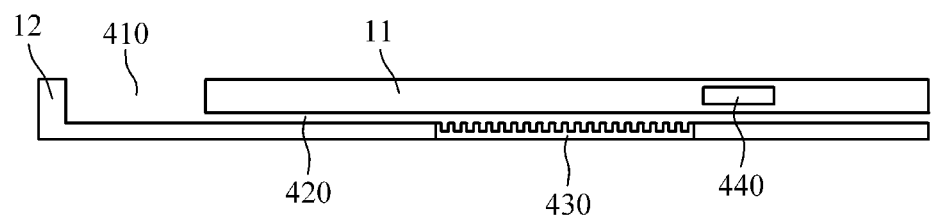
FIG. 5 is a side view of the microfluidic chip of FIG. 4.

FIG. 4 is a diagram illustrating a microfluidic chip according to yet another example embodiment. FIG. 5 is a side view of the microfluidic chip of FIG. 4.

Referring to FIGS. 4 and 5, a microfluidic chip 400 according to an example embodiment may include a storage 410 in which a sample is loaded, and if desired, may be pre-treated; a well array 430 in which an enzyme reaction of a sample solution is performed; and a micro fluid mover 440 that moves a micro fluid. Further, a mixer 420 may be disposed in a channel that connects the storage 410 and the well array 430. In addition, a filter 450 may be disposed in a channel between the storage 410 and the mixer 420. As described above, the microfluidic chip 400 may include the substrate 10 having a two-layer structure in which the upper plate 11 and the lower plate 12 are coupled to each other, and the respective microfluidic structures may be disposed on the upper plate 11 or the lower plate 12. The substrate 10 may include an air-permeable polymer, polydimethylsiloxane (PDMS), and the like.

The storage 410 may perform the same or similar function as the first storage 110 described above, and thus a detailed description thereof will be omitted. In an example embodiment, the storage 410 may include a reactant of a target material. For example, the reactant of the target material may be freeze-dried and fixed. As the sample is loaded in the storage 410, the freeze-dried reactant may be dissolved in the sample. As described above, a pretreatment process of the loaded sample may be performed in the storage 410. A sample solution, in which the reactant of the target material is dissolved, in the storage 410 may be mixed by the mixer 420 and is injected into the well array 430. The filter 450 may be disposed before or behind the mixer 420 on the substrate 10, to filter biomolecules.

The well array 430 may have a nanostructure, and may include a material and/or a structure having electrical heating properties or optical heating properties. Various enzyme reactions may occur in the well array 430, and biomolecules may be detected by measuring an optical signal by using an external optical unit during the enzyme reactions. The well array 430 may perform the same or similar function as the well array 130 described above, and thus a detailed description thereof will be omitted.

The microfluidic mover 440 may be, for example, a vacuum battery for moving the sample loaded in the storage 410 to the well array 430 by a vacuum method, but is not limited thereto.

Figure 6A:
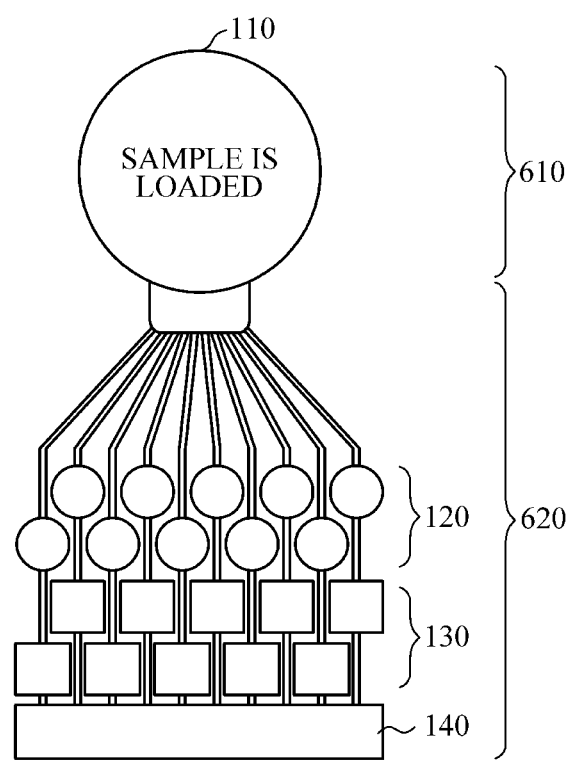
FIGS. 6A and 6B are diagrams illustrating examples of an arrangement of a microfluidic chip according to example embodiments.
Figure 6B:
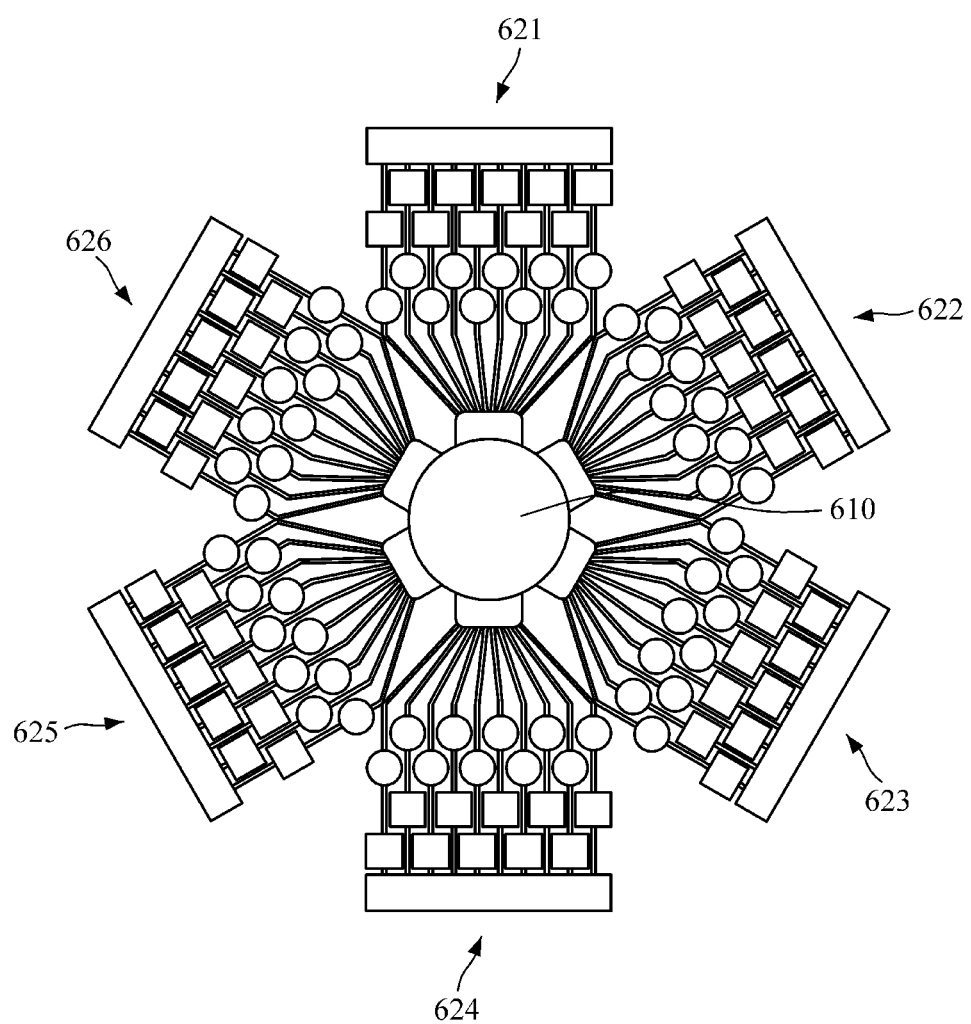

FIGS. 6A and 6B are diagrams illustrating various examples of an arrangement of a microfluidic chip according to example embodiments.

Referring to FIG. 6A, the microfluidic chip may be divided into a first area 610 and a second area 620. The first area 610 may include the first storage 110 in which a sample is loaded and/or pre-treated, and the second area 620 may include structures 120, 130, and 140 for dispersing and processing the sample introduced from the first storage 110. Referring to FIG. 6A, one second area 620 of the microfluidic chip according to an example embodiment may be connected to one outlet formed in the first storage 110. Referring to FIG. 6B, a plurality of outlets are formed in the first area 610 to be connected to a plurality of second areas 621, 622, 623, 624, 625, and 626. A number of second areas may vary depending on a number of target materials or a size of the microfluidic chip.

FIGS. 7 to 11 are block diagrams illustrating an apparatus for detecting biomolecules, according to example embodiments.

Figure 7:
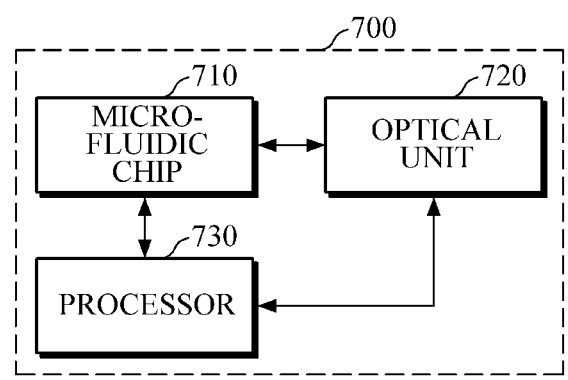
FIGS. 7, 8, 9, and 10 are block diagrams illustrating an apparatus for detecting biomolecules, according to example embodiments.

Referring to FIG. 7, an apparatus 700 for detecting biomolecules includes a microfluidic chip 710, an optical unit 720, and a processor 730. The microfluidic chip 710 is described in detail above with reference to FIGS. 1 to 6B, and thus will be briefly described below.

A sample is loaded in a first storage of the microfluidic chip 710, and the loaded sample may be dispersed in one or more second storages by using a manual and/or automatic driving device, a capillary or an electro-wetting device, and the like. The sample may include respiratory secretions, or bio-fluids including at least one of blood, urine, perspiration, tears, saliva, etc., or a swab sample of an upper respiratory tract, or a solution of the bio-fluid or the swab sample dispersed in other medium, such as water, saline solution, alcohol, phosphate buffered saline solution, vital transport media, and the like. A volume of the sample may be in a range of 1 µL to 1000 µL, and may be, for example, 20 µL.

The respective second storages may include reactants for each target material, and when the sample is introduced from the first storage, the reactants for each target material are dissolved therein. In this case, the reactants for each target material may be freeze-dried. The target material may include a duplex of one or more of ribonucleic acid (RNA), deoxyribonucleic acid (DNA), peptide nucleic acid (PNA), and locked nucleic acid (LNA), oligopeptide, protein, toxin, etc., and may include reverse transcriptase, polymerase, ligase, peroxidase, primer, probe, etc., but is not limited thereto.

When a sample solution, in which the reactants of the target materials are dissolved, is introduced into a micro/nano well array, an enzyme reaction of the sample solution is performed in the micro/nano well array. The enzyme reaction may include a nucleic acid amplification reaction including at least one of polymerase chain reaction (PCR) amplification and isothermal amplification, or oxidation-reduction reaction, hydrolytic reaction, and the like.

The optical unit 720 may measure an optical signal while the enzyme reaction is performed in each well of the micro/nano well array. The optical signal may include fluorescence, phosphorescence, absorbance, surface plasmon resonance, and the like. The optical unit 720 may include a light source for emitting light onto a sample solution of the micro/nano well, and a detector for detecting an optical signal reflected from the sample solution of the micro/nano well. The light source may include an LED, laser, Vertical-Cavity Surface-Emitting Laser (VCSEL), and the like, but is not limited thereto. In addition, the detector may include a photomultiplier tube, a photo detector, a photomultiplier tube array, a photo detector array, a complementary metal-oxide semiconductor (CMOS) image sensor, and the like, but is not limited thereto. Furthermore, the optical unit 720 may further include a filter for passing a specific wavelength, a mirror for directing light, emanating from the micro/nano well, toward the detector, and a lens for collimating light emanating from the micro/nano well, and the like.

The processor 730 may be electrically connected to the optical unit 720, and may control driving of the light source of the optical unit 720. In addition, the processor 730 may receive the optical signal from the detector and may analyze the optical signal, and may detect biomolecules based on the analysis. For example, the processor 730 may perform quantitative analysis of biomolecules based on Poisson distribution using a result of digital nucleic acid amplification detected by the detector.

Figure 8:
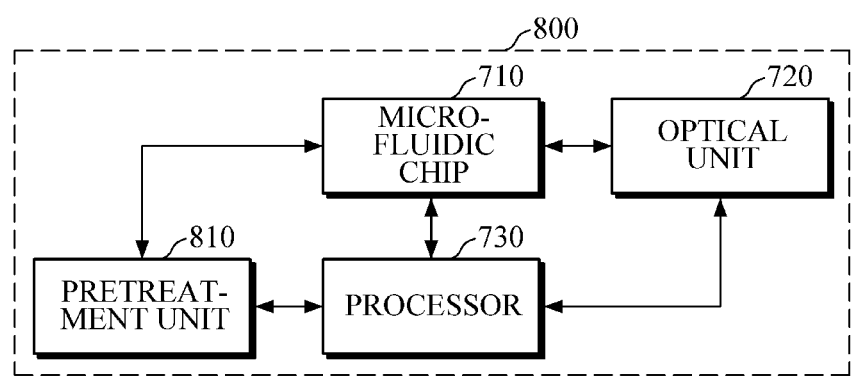

Referring to FIG. 8, an apparatus 800 for detecting biomolecules according to an example embodiment may further include a pretreatment unit 810, in addition to the configuration of the apparatus 700 for detecting biomolecules of FIG. 7.

The pretreatment unit 810 may perform pretreatment of the sample loaded in the first storage, in which the pretreatment includes, for example, heating, chemical treatment, treatment with magnetic beads, solid phase extraction, ultrasonication, or the like. To this end, the pretreatment unit 810 may include various materials or structures for pretreatment, such as magnetic beads provided inside and/or outside of the first storage, a chemical treatment area, a solid phase extractor, an ultrasound device (e.g., ultrasonic source), an optical and/or electrical heating device (or heater), etc., and may control such materials or structures. At least some of the functions of the pretreatment unit 810 may be performed by the processor 730.

Figure 9:
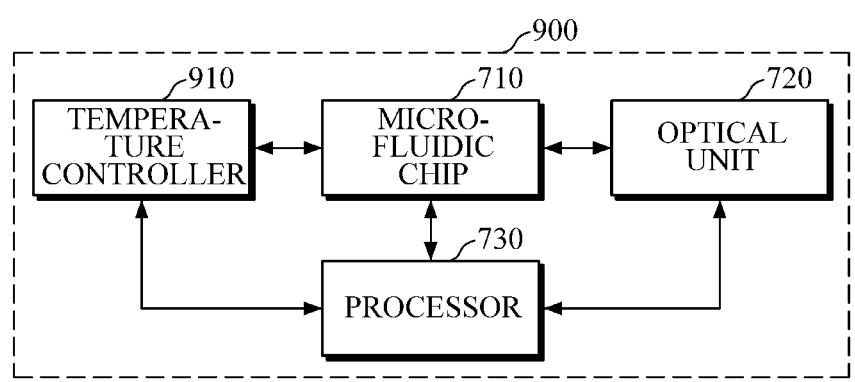

Referring to FIG. 9, an apparatus 900 for detecting biomolecules according to an example embodiment may further include a temperature controller 910, in addition to the configuration of the apparatuses 700 or 800 for detecting biomolecules of FIG. 7 or FIG. 8.

The temperature controller 910 may control temperature of the sample received in the first storage, the second storage, and/or the micro/nano well array. For example, when the sample is loaded in the first storage, the temperature controller 910 may control temperature of the sample to be maintained at an isothermal temperature of 95° C. or higher. In addition, when the sample is dispersed in the second storage, the temperature controller 910 may control temperature of the sample to be maintained at an isothermal temperature of 30° C. to 60° C.

The temperature controller 910 may include a material or a structure for controlling temperature inside or outside of the first storage, the second storage, and/or the micro/nano well array. For example, an electrical heater for electrical heating of the sample may be formed inside the first storage, the second storage, and/or the micro/nano well array. The electrical heater may include, for example, a heating element and/or a Peltier element, and the like. Alternatively, the temperature controller 910 may include an optical heater. The optical heater may include one or more light sources disposed outside of the microfluidic chip 710 and emitting light onto the microfluidic chip 710, and a heating element disposed inside the first storage, the second storage, and/or the micro/nano well of the microfluidic chip 710 and reacting to light of the light sources, and the like.

In addition, the temperature controller 910 may include a temperature sensor disposed inside or outside of the microfluidic chip 710 and measuring temperature of the sample in the first storage, the second storage, and/or the micro/nano well. In this case, a thermocouple having a bimetal junction generating temperature-dependent electromotive force (EMF), a resistive thermometer including materials having electrical resistance proportional to temperature, thermistors, an integrated circuit (IC) temperature sensor, a quartz thermometer, and the like may be used as the temperature sensor.

Figure 10:
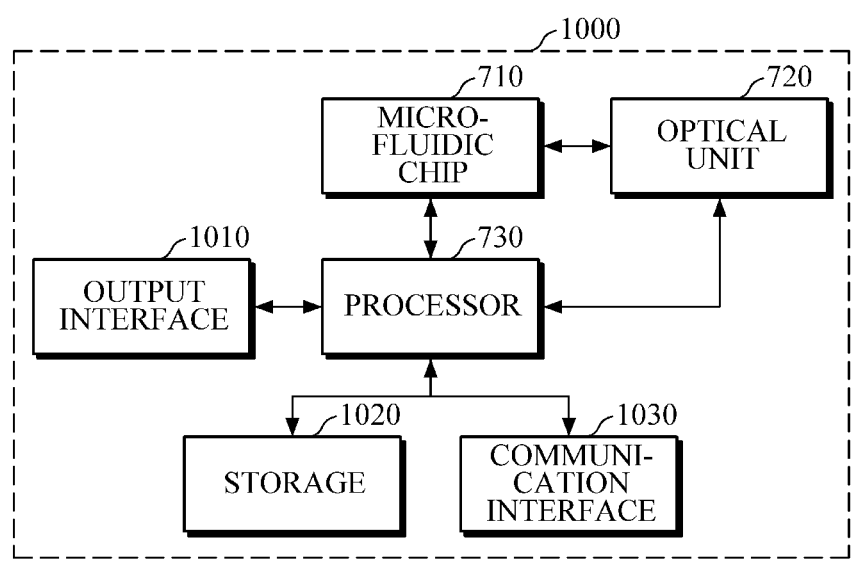

Referring to FIG. 10, an apparatus 1000 for detecting biomolecules according to an example embodiment may further include an output interface 1010, a storage 1020, and a communication interface 1030, in addition to the configuration of the apparatuses 700, 800, or 900 of FIG. 7, FIG. 8, or FIG. 9.

The output interface 1010 may output, for example, information on a biomolecule detection process, a biomolecule detection result, and/or information on interaction with a user during the biomolecule detection process, and the like. The output interface 1010 may provide the information to a user by visual, audio, and/or tactile method and the like using a visual output module (e.g. display), an audio output module (e.g., speaker), a haptic module, and the like.

The storage 1020 may store, for example, a variety of information for detecting biomolecules and/or the biomolecule detection result, and the like. The storage 1020 may include at least one storage medium including, for example, a flash memory type memory, a hard disk type memory, a multimedia card micro type memory, a card type memory (e.g., a secure digital (SD) memory, an extreme digital (XD) memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

The communication interface 1030 may communicate with an external device. For example, the communication interface 1030 may transmit data generated by the apparatus 1000 for detecting biomolecules, e.g., the biomolecule detection result and the like, to the external device, and may receive data related to detecting biomolecules from the external device. The external device may include medical equipment, a printer to print out results, or a display device. In addition, the external device may include a digital television (TV), a desktop computer, a mobile phone, a smartphone, a tablet personal computer (PC), a laptop computer, Personal Digital Assistants (PDA), Portable Multimedia Player (PMP), a navigation device, an MP3 player, a digital camera, a wearable device, etc., but is not limited thereto.

The communication interface 1030 may communicate with the external device by using, for example, Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, Wi-Fi communication, Radio Frequency Identification (RFID) communication, third generation (3G), fourth generation (4G), and fifth generation (5G) communications, and the like. However, this is merely an example and is not intended to be limiting.

Figure 11:
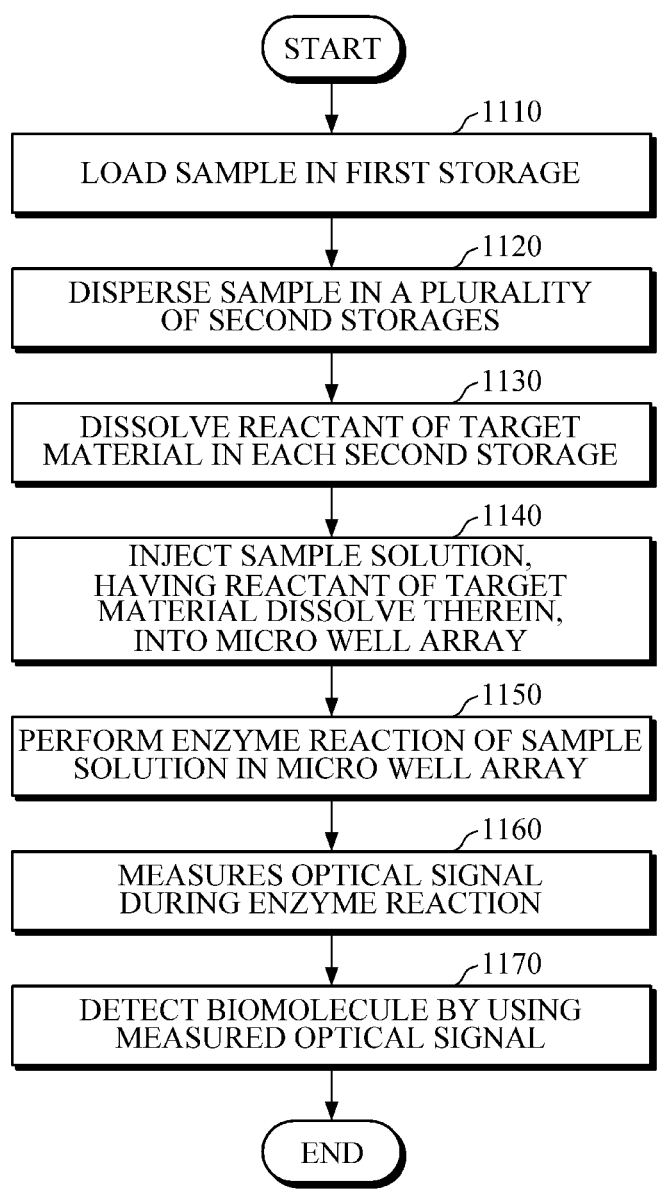
FIG. 11 is a flowchart illustrating a method of detecting biomolecules according to an example embodiment.

FIG. 11 is a flowchart illustrating a method of detecting biomolecules according to an example embodiment.

The method of detecting biomolecules of FIG. 11 may be performed by any one of the apparatuses 700, 800, 900, and 1000 for detecting biomolecules according to example embodiments of FIGS. 7 to 10, which are described in detail above, and thus will be briefly described below in order to minimize redundancy.

First, a sample is loaded in the first storage of the microfluidic chip in 1110, and if desired, pretreatment may be performed on the loaded sample by heating, chemical treatment, treatment with magnetic beads, solid phase extraction, ultrasonication, and the like.

Then, the sample in the first storage is dispersed and received in the second storage in 1120. The sample loaded in the first storage may be dispersed in a plurality of second storages by using a manual and/or automatic driving device, a capillary or an electro-wetting device, and the like. In this process, microparticles may be filtered by a filter disposed on a channel connecting the first storage and the second storage.

Subsequently, when the sample is injected into the second storages, reactants for each target material included in the second storages are dissolved in the sample in 1130. In this case, the respective second storages may include reactants for different target materials, and the reactants for the target materials may be freeze-dried and fixed to the second storages.

Next, sample solutions, in which the reactants for the target materials are dissolved, are injected into a micro/nano well array from the second storages in 1140. In this case, the dissolved sample solutions may be mixed well by using a mixer disposed at a channel that connects the second storages and the well array or disposed in the second storages.

Then, an enzyme reaction of the sample solutions is performed in the micro/nano well array in 1150. In this case, if the same solution is an RNA sample, reverse transcription using reverse transcriptase may be performed on the RNA sample. The enzyme reaction may include, for example, a nucleic acid amplification reaction including at least one of polymerase chain reaction (PCR) amplification and isothermal amplification, or oxidation-reduction reaction, hydrolytic reaction, and the like. In this case, temperature of the sample in the micro/nano well may be controlled by using a material or a device for optical heating or electrical heating, and the like.

Subsequently, the apparatus for detecting biomolecules may measure an optical signal during an enzyme reaction of the sample solution in the micro/nano well in 1160, and may detect biomolecules by using the measured optical signal in 1170. In this case, by emitting light of a predetermined wavelength onto the micro/nano well for a predetermined period of time by using the light source of the optical unit, the apparatus for detecting biomolecules may detect an optical signal, such as fluorescence, phosphorescence, absorbance, surface plasmon resonance, and the like, and may obtain a quantitative result on biomolecules by analyzing the detected optical signal based on Poisson distribution.

The disclosure may be realized as a computer-readable code written on a computer-readable recording medium. The computer-readable recording medium may be any type of recording device in which data is stored in a computer-readable manner.

Examples of the computer-readable recording medium include a ROM, a RAM, a compact disc (CD)-ROM, a magnetic tape, a floppy disc, an optical data storage, and a carrier wave (e.g., data transmission through the Internet). The computer-readable recording medium may be distributed over a plurality of computer systems connected to a network so that a computer-readable code is written thereto and executed therefrom in a decentralized manner. Functional programs, codes, and code segments for implementing the disclosure be easily deduced by computer programmers of ordinary skill in the art, to which the disclosure pertains.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While example embodiments of the disclosure have been particularly shown and described, it will be understood by one of ordinary skill in the art that variations in form and detail may be made therein without departing from the spirit and scope of the attached claims.

What is claimed is:

1. A microfluidic chip comprising:
a first storage configured to accommodate a sample, the sample comprising target materials;
a plurality of second storages connected to the first storage, the plurality of second storages comprising reactants for the target materials;
a plurality of well arrays connected to the plurality of second storages, respectively, and configured to accommodate a solution of the sample, in which the reactants for the target materials are dissolved;
a plurality of first channels respectively connecting the plurality of second storages and the plurality of well arrays, and a plurality of first valves disposed at the plurality of first channels and configured to control a fluid flow from the plurality of second storages to the plurality of well arrays; and
a plurality of second channels respectively connecting the plurality of well arrays and a structure configured to control a velocity of an inflow of the sample, and a plurality of second valves disposed at the plurality of second channels and configured to control a fluid flow from the plurality of well arrays to the structure, wherein the structure includes at least one of an absorption pad, a vacuum pump, an active pump, or a capillary pump.

2. The microfluidic chip of claim 1, wherein a number of the plurality of second storages is in a range of 2 to 20.

3. The microfluidic chip of claim 2, wherein a number of the plurality of well arrays is greater than or equal to the number of the plurality of second storages.

4. The microfluidic chip of claim 1, wherein a size of a well included in each of the plurality of well arrays is less than or equal to 1 nL.

5. The microfluidic chip of claim 1, wherein a number of wells included in each of the plurality of well arrays is in a range of ten thousand to one million.

6. The microfluidic chip of claim 1, wherein a bottom and a wall of a well included in each of the plurality of well arrays have different surface properties.

7. The microfluidic chip of claim 1, wherein at least one of the first storage or a well array, of the plurality of well arrays, comprises at least one of a field effect transistor (FET), a silicon photonic structure, a two-dimensional (2D) micro material, a 2D nano material, a 2D micro structure, or a 2D nano structure.

8. The microfluidic chip of claim 1, further comprising a filter on a channel, the channel connecting the first storage and the plurality of second storages.

9. The microfluidic chip of claim 8, further comprising a mixer disposed inside a second storage of the plurality of second storages or at an outlet of the second storage.

10. The microfluidic chip of claim 1, further comprising at least one of a slide or a stamper configured to inject the solution of the sample of the plurality of second storages into the plurality of well arrays or to fix the solution of the sample to the plurality of well arrays.

11. The microfluidic chip of claim 1, comprising at least one of a bubble trap, a bubble removing material, or a gas permeable material, provided inside a well array, of the plurality of well arrays, or at an inlet of the well array.

12. A method of detecting biomolecules using the microfluidic chip of claim 1, the method comprising:
loading a sample in the first storage of the microfluidic chip;
providing the sample, loaded in the first storage, to the plurality of second storages, each of the plurality of second storages comprising reactants for target materials;
injecting a solution of the sample, in which the reactants are dissolved, from the plurality of second storages into the plurality of well arrays, which accommodates the injected solution of the sample, wherein the injecting comprises injecting the solution using the plurality of first valves, thereby controlling a fluid flow from the plurality of second storages to the plurality of well arrays, and using the plurality of second valves, thereby controlling a fluid flow from the plurality of well arrays to the structure;
measuring an optical signal during an enzyme reaction that occurs in the solution of the sample injected into the plurality of well arrays; and
detecting biomolecules based on the measured optical signal.

13. The method of claim 12, further comprising performing pretreatment of the sample loaded in the first storage, the pretreatment comprising at least one of heating, chemical treatment, treatment with magnetic beads, solid phase extraction, or ultrasonication.

14. The method of claim 12, wherein the target materials comprise RNA, and the reactants for the target materials comprise reverse transcriptase.

15. The method of claim 12, wherein the enzyme reaction comprises at least one of a nucleic acid amplification reaction, oxidation-reduction reaction, or hydrolytic reaction, the nucleic acid amplification reaction comprising at least one of polymerase chain reaction (PCR) amplification or isothermal amplification.

16. A microfluidic chip comprising:
a first storage configured to accommodate a sample, the sample comprising target materials;
a plurality of second storages connected to the first storage, the plurality of second storages comprising reactants for the target materials;

a plurality of well arrays connected to the plurality of second storages, respectively, and configured to accommodate a solution of the sample, in which the reactants for the target materials are dissolved; and
an absorption pad connected to the plurality of well arrays.

17. The microfluidic chip of claim 16, further comprising a plurality of channels respectively connecting the plurality of well arrays and the absorption pad and a plurality of valves disposed at the plurality of channels.

18. A microfluidic chip comprising:
a storage configured to accommodate a sample, the sample comprising a target material, the storage comprising a reactant for the target material;
a mixer disposed between the storage and a first end of a well array, the mixer being configured to mix a solution of the sample, in which the reactant for the target material is dissolved;
a micro fluid mover configured to move the sample located in the storage to the well array, wherein the micro fluid mover is disposed adjacent to a rear second end of the well array, the second end facing the first end; and
the well array in which an enzyme reaction occurs in the solution of the sample that is injected through the mixer,
wherein the microfluidic chip is provided on a substrate comprising an upper plate and a lower plate, and
wherein the well array is provided on the lower plate and the micro fluid mover is provided on the upper plate.

19. The microfluidic chip of claim 18, wherein at least one of the storage or the well array comprises at least one of a field effect transistor (FET), a silicon photonic structure, a 2D micro material, a 2D nano material, a 2D micro structure, and a 2D nano structure.

20. The microfluidic chip of claim 18, further comprising a filter at an outlet of the storage.

21. An apparatus for detecting biomolecules, the apparatus comprising:
a first storage configured to accommodate a sample, the sample comprising target materials;
a plurality of second storages, each of which comprises reactants for the target materials;
a plurality of well arrays in which an enzyme reaction occurs in a solution of the sample, in which the reactants for the target materials are dissolved;
a plurality of first channels respectively connecting the plurality of second storages and the plurality of well arrays and a plurality of first valves disposed at the plurality of first channels and configured to control a fluid flow from the plurality of second storages to the plurality of well arrays;
a plurality of second channels respectively connecting the plurality of well arrays and a structure configured to control a velocity of an inflow of the sample, and a plurality of second valves disposed at the plurality of second channels and configured to control a fluid flow from the plurality of well arrays to the structure, wherein the structure includes at least one of an absorption pad, a vacuum pump, an active pump, or a capillary pump;
an optical unit, including a light source and a detector, the optical unit being configured to, during an occurrence of the enzyme reaction, emit first light onto the solution of the sample in the plurality of well arrays and configured to measure an optical signal reflected from the solution of the sample; and
a processor configured to detect biomolecules based on the optical signal.

22. The apparatus of claim 21, wherein the target materials comprise one or more of a duplex of one or more of ribonucleic acid (RNA), deoxyribonucleic acid (DNA), peptide nucleic acid (PNA), and locked nucleic acid (LNA); oligopeptide, protein, and toxin.

23. The apparatus of claim 21, wherein the reactants for the target materials comprise one or more of reverse transcriptase, polymerase, ligase, peroxidase, primer, and probe.

24. The apparatus of claim 23, wherein the primer comprises oligonucleotide.

25. The apparatus of claim 23, wherein the probe comprises at least one of oligonucleotide, a fluorescent material, or quencher.

26. The apparatus of claim 21, wherein the reactants for the target materials are freeze-dried.

27. The apparatus of claim 21, further comprising a pretreatment unit configured to perform pretreatment of the sample accommodated in the first storage, the pretreatment unit comprising at least one of: a heater, a chemical treatment area, a magnetic bead, a solid phase extractor, or a ultrasonic source.

28. The apparatus of claim 21, further comprising a temperature controller configured to control a temperature of the sample accommodated in the first storage.

29. The apparatus of claim 28, wherein the temperature controller comprises at least one of an optical heater, an electrical heater, or a temperature sensor, the optical heater comprising a light source configured to emit second light onto the first storage and a heating material configured to react to the second light, and the electrical heater comprising one of a heating element and a Peltier element.

30. The apparatus of claim 21, wherein the enzyme reaction comprises at least one of a nucleic acid amplification reaction, oxidation-reduction reaction, or hydrolytic reaction, the nucleic acid amplification reaction comprising at least one of polymerase chain reaction (PCR) amplification or isothermal amplification.

31. The apparatus of claim 21, wherein the optical signal comprises at least one of fluorescence, phosphorescence, absorbance, and surface plasmon resonance.

* * * * *